United States Patent [19]
Siligoni et al.

[11] Patent Number: 4,502,016
[45] Date of Patent: Feb. 26, 1985

[54] FINAL BRIDGE STAGE FOR A RECEIVER AUDIO AMPLIFIER

[75] Inventors: Marco Siligoni, Vittuone; Pietro Consiglio, Milan, both of Italy

[73] Assignee: SGS-ATES Componenti Elettronici S.p.A., Agrate Brianza, Italy

[21] Appl. No.: 407,785

[22] Filed: Aug. 13, 1982

[30] Foreign Application Priority Data

Aug. 26, 1981 [IT] Italy ............................ 23646 A/81

[51] Int. Cl.³ .......................... H03F 3/183; H03F 3/45
[52] U.S. Cl. .................................... 330/146; 330/252; 330/263; 381/120
[58] Field of Search ............... 330/146, 255, 263, 264, 330/295, 252; 381/120, 121

[56] References Cited
FOREIGN PATENT DOCUMENTS 771785 10/1980 U.S.S.R. ............................ 330/146

Primary Examiner—James B. Mullins
Attorney, Agent, or Firm—Wenderoth, Lind & Ponack

[57] ABSTRACT

A final bridge stage for a receiver audio amplifier, which can be monolithically integrated, consists of two pairs of complementary bipolar transistors. The collectors of the transistors of each of the transistor pairs are connected together to form two terminals to which a transducer is connected. The transistor emitters of NPN type and PNP type transistors are respectively connected to the negative pole and, through a constant current generator, to the positive pole of a supply voltage generator. The constant current generator consists of a small resistor to which a constant voltage is applied by means of a suitable circuit. The bases of the bridge transistors are connected to the signal source by means of suitable circuits. The signal source controls similar transistors in phase opposition, while at the same time controlling the complementary transistors in phase opposition.

12 Claims, 5 Drawing Figures

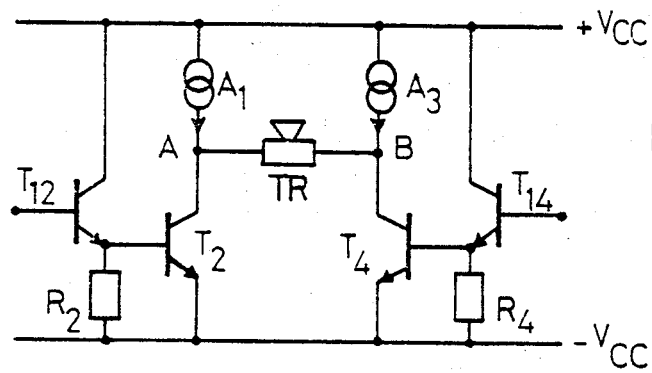
FIG. 1
PRIOR ART
FIG. 2
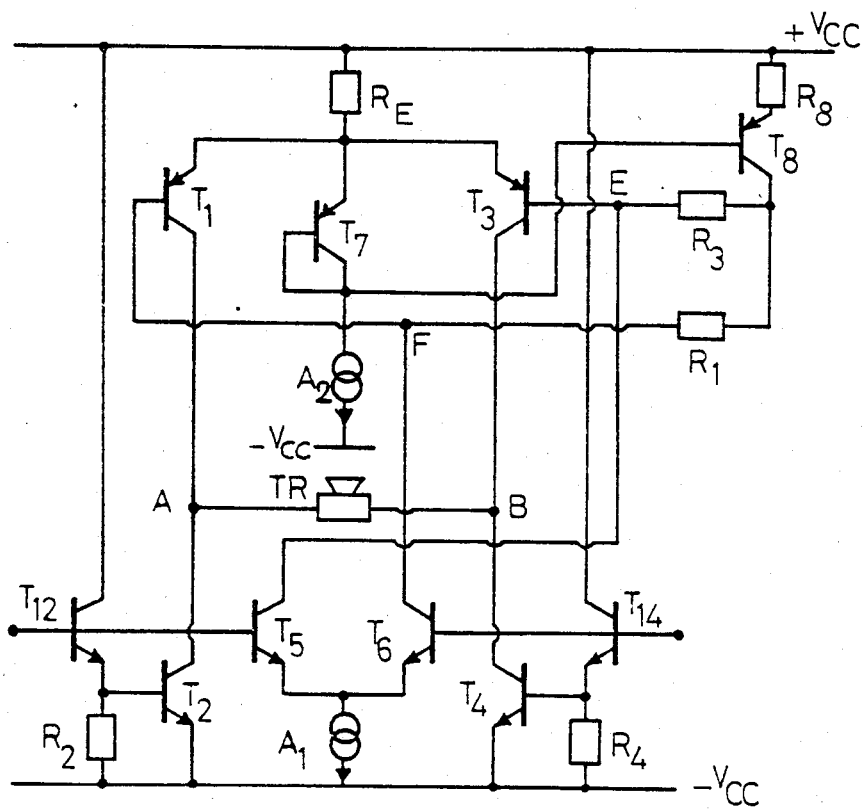

FINAL BRIDGE STAGE FOR A RECEIVER AUDIO AMPLIFIER

BACKGROUND OF THE INVENTION

The present invention refers to a final bridge stage for a receiver audio amplifier which operates on low voltage and is monolithically integratable and useable in both consumer telephones and electromedical devices for persons having poor hearing, in order to control an electroacoustic transducer.

The final stage of a receiver amplifier for a consumer telephone must be able to effect a rigorously constant absorption of current with respect to a variable input signal. In fact, the terminals of a bifilar telephone line to which the telephone is connected are at the same time its feeder terminals, as well as the output terminals for the signal that the telephone must transduce. Therefore, variations in the absorption of the receiver amplifier current could be erroneously interpreted as signal variations.

Moreover, the final stage of a receiver amplifier connected to a low voltage bifilar telephone line must have a low current absorption and a low "voltage loss", defined as the difference, in normal operating conditions, between the voltage to the line terminals and the voltage resulting from the final stage to which the electroacoustic transducer is connected.

A smaller limitation of the dynamic 'range' of the amplified signal corresponds to a smaller loss of current of the final stage.

In telephony however, it is important to try to minimize the absorption of current, even if so doing results in a slightly larger voltage loss. The final stages for receiver audio amplifiers which offer the best dynamic 'range' of the signal at a current absorption equivalence, are those which have a "bridge" circuit.

In present technology, a final bridge stage for receiver audio amplifiers, which is monolithically integratable and useable, for example, in telephony, consists, as is illustrated in FIG. 1, of a bridge configuration, comprising a pair of constant current generators, indicated as A1 and A3, and a pair of bipolar transistors (NPN type), T2 and T4.

The T2 collector and the T4 collector to which, respectively, are connected the first and second terminals of a TR electroacoustic transducer, at point A and point B respectively, are in turn connected to the positive pole, +VCC, of a supply voltage generator, through generator A1 and generator A3 respectively. The T2 and T4 emitters are connected to the negative pole, −VCC, of the supply voltage generator.

The bases of T2 and T4 are connected to the emitters of two bipolar transistors (NPN type), T12 and T14 respectively, which control T2 and T4. They are also connected to the negative pole, −VCC, of the supply voltage generator through a resistor R2 and a resistor R4 respectively. The T12 collector and the T14 collector are connected to +VCC; the bases of T12 and T14 are connected to a signal source (which is not illustrated), and which controls such transistors in phase opposition.

The current absorption of a final bridge stage of this type is constant and equal to the sum of the currents produced by the A1 and A3 generators, even in the absence of a signal.

Typically, the A1 and A3 current generators consist of PNP bipolar transistors which function in the active zone. Their emitters are connected to +VCC, and their collectors are connected to the T2 and T4 collectors respectively. The total loss of voltage of the prior art stage is therefore equal to the sum of the collector-emitter voltage of a transistor, T2 or T4, (NPN type), in saturation (VCE sat.), and of the collector-emitter voltage of a transistor (PNP type), A1 or A3, in saturation (VCE sat.), at the limit of the active zone.

SUMMARY OF THE INVENTION

The object of this invention is to create a final bridge stage for a receiver audio amplifier, operating at a low supply voltage, which is monolithically integratable, and which has a lower current absorption rate than that of a prior art final bridge stage, as well as causing a loss of voltage which is substantially the same as that of prior art stages.

This object is achieved with the final bridge stage for the receiver audio amplifier which is described in the claims which follow the present description.

BRIEF DESCRIPTION OF THE DRAWINGS

The invention will be more clearly understood from the following detailed description, given as an example, and therefore not to be construed as limiting in regard to the accompanying drawing.

FIG. 1 is the circuit diagram (which has been previously described) of a prior art final bridge stage for a receiver audio amplifier, and, FIG. 2 describes a final bridge stage according to the present invention. The diagrams use the same letter and number references for their corresponding parts.

DESCRIPTION OF THE PREFERRED EMBODIMENTS

Figure 3:
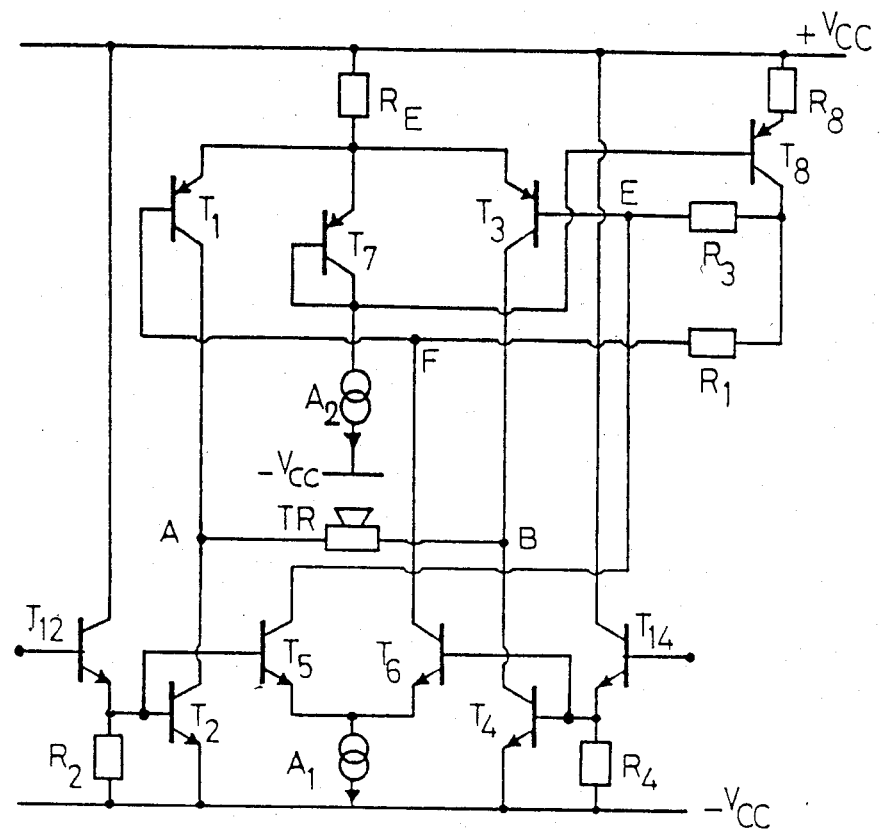
FIGS. 3 and 4 and 5 illustrate modifications of the embodiment illustrated in FIG. 2.

The diagram for a final bridge stage for a receiver audio amplifier according to the present invention is shown in FIG. 2, and consists of a pair of bipolar transistors (PNP type), indicated as T1 and T3, and a pair of NPN bipolar transistors, indicated as T2 and T4.

The T1 and T3 collectors are respectively connected to the T2 and T4 collectors. These connections constitute a pair of terminals, indicated by the letters A and B, to which the first and second terminals of an electroacoustic transducer, inidcated as TR are respectively attached. The T1 emitter is connected to the T3 emitter; the resulting junction point is connected, through a resistor RE, to the positive pole, +VCC, of a supply voltage generator, and to the emitter of a bipolar transistor, T7 (PNP type), whose base is shortcircuited to its collector, which in turn is connected to the negative pole, −VCC, of the supply voltage generator, through a constant current generator A2.

The emitters of T2 and T4 are connected directly to the negative pole, −VCC.

The T2 base is connected to −VCC through a resistor R2, and is also connected to the emitter of a bipolar transistor, T12 (NPN type).

The T4 base is connected to −VCC through a resistor R4, and is also connected to the emitter of a bipolar transistor, T14, (NPN type). The T12 and T14 collectors are connected to +VCC. The T12 and T14 bases are connected to a signal source (not illustrated) which controls such transistors in phase opposition.

The diagram shown in FIG. 2 also includes a pair of bipolar transistors, T5 and T6 (NPN type), whose bases are also connected to the signal source, which controls these transistors in phase opposition amongst themselves, and in phase respectively with T12 and T14.

The T5 and T6 emitters are both connected to −VCC through the same constant current generator A1.

The T5 collector and the T6 collector are respectively connected to the base of T3 and the base of T4 at points E and F. Connecting points E and F are both connected, through a resistor R3 and a resistor R1 respectively, to the collector of a bipolar transistor, T8 (PNP type), whose emitter is connected to +VCC through a resistor R8.

The T8 base is connected directly to the T7 collector.

Examining the functioning of the circuit represented in FIG. 2, the current of the T8 transistor collector, unlike the current from the bases of T1 and T3, flows through transistors T5 and T6 and is forced by the A1 constant current generator. This current is constant. Therefore, the current from the T8 emitter is also constant, and results in a drop of constant voltage VR8, across the resistor R8. Since:

$$VR8 + VBE\ T8 = VRE + VBE\ T7$$

forces, by means known to those skilled in the art, (ie. such as the use of identical constant current generators A1 and A2) the similarity of the base emitter voltages of T7, VBE T7, and T8, VBE T8 and therefore:

$$VBE\ T7 = VBE\ T8$$

the voltage applied to resistors RE, VRE, results in an equal drop in voltage across resistor R8: $VRE = VR8$.

The VRE voltage is therefore constant, and therefore the value of current IRE which flows through resistor RE is determined and constant. Resistor RE, to whose terminals the VRE voltage is applied, may be considered as a constant current generator.

A constant rate IRE current, IA2, imposed by constant current generator A2, flows through the T7 transistor. The rest of IRE instead flows in the T1, T2, T3 and T4 transistors of the bridge, and in the TR transducer through terminals A and B.

The distribution of the constant IRE-IA2 current in the bridge elements and the consequent net flow of current in the transducer are determined by the signal. In the absence of a signal, the current in T1 and T2 is equal to the current in T3 and T4, and the net flow of current in TR is equal to zero. According to the invention, in the final stage, the current in T2 and T4 is regulated by the signal to be amplified and transduced; but through transistors T5 and T6, the current in T1 and T3 is also regulated. When the signal exceeds a given level, the current IRE-IA2 flows in only one of the two transistors, T1 and T3, thus achieving, in comparison to prior art final stages, an absorption of current which is practically halved for equal power at the transducer.

Let it be assumed, for example, that the signal to be transduced determines an increase of current in the T4 collector and a decrease in that of T2, with a consequent flow of current from terminal A to terminal B through TR. At the same time, the current of the collector of T6 increases, while the current of the collector of T5 decreases, causing a major drop in voltage across R1 and a minor drop in voltage across R3. In addition, the base-emitter voltage and the T1 base current increases, and the base-emitter voltage and the T3 base current decreases, thus increasing the current in the collector of T1 and decreasing that in T3. Therefore, according to prior art circuit technology, and current absorbed by the circuit, in equivalence with the flow of current through TR, is less.

The final bridge stage according to the present invention functions in an analogous and symmetrical way to the one described above when the signal determines an increase in the T2 collector current and a decrease in that of T4 instead. The loss of voltage is equal to the sum of the saturation voltage of the collector-emitter of the NPN transistor, of the saturation voltage of the collector-emitter of the PNP transistor, and of the decrease in voltage across resistor RE. The R8 resistor is sized in a way that VR8, and therefore VRE, will be very small, (typically 0.06 v or less), and therefore, the sum of the saturation voltage of the collector-emitter of the PNP transistor and the voltage drop across resistor RE is practically equal to the saturation voltage of transistor PNP.

Therefore, the loss of voltage of a final bridge stage according to the present invention is practically equal to that of a final bridge stage of prior art technology. A final bridge stage according to this invention for a receiver audio amplifier is particularly adapted to be integrated into a semi-conductor monolithic chip with present integration technology.

Inasmuch as only one example of the execution of the invention has been described an illustrated, it is obvious that numerous variations are possible without moving beyond the scope of the invention.

Figure 5:
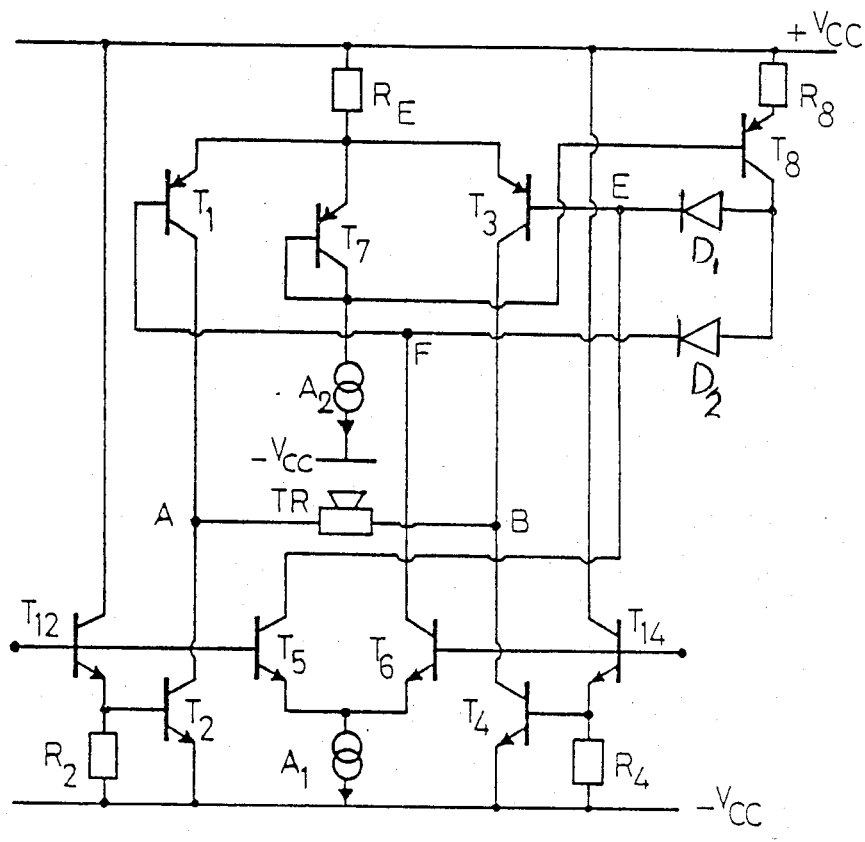

As an example, resistors R3 and R1 can be replaced by diodes $D_1$ and $D_2$, as illustrated in FIG. 5. Instead of being directly connected to the signal source, the T5 and T6 bases can be connected respectively to the emitter of T12 and the emitter of T14 as illustrated in FIG. 3.

Figure 4:
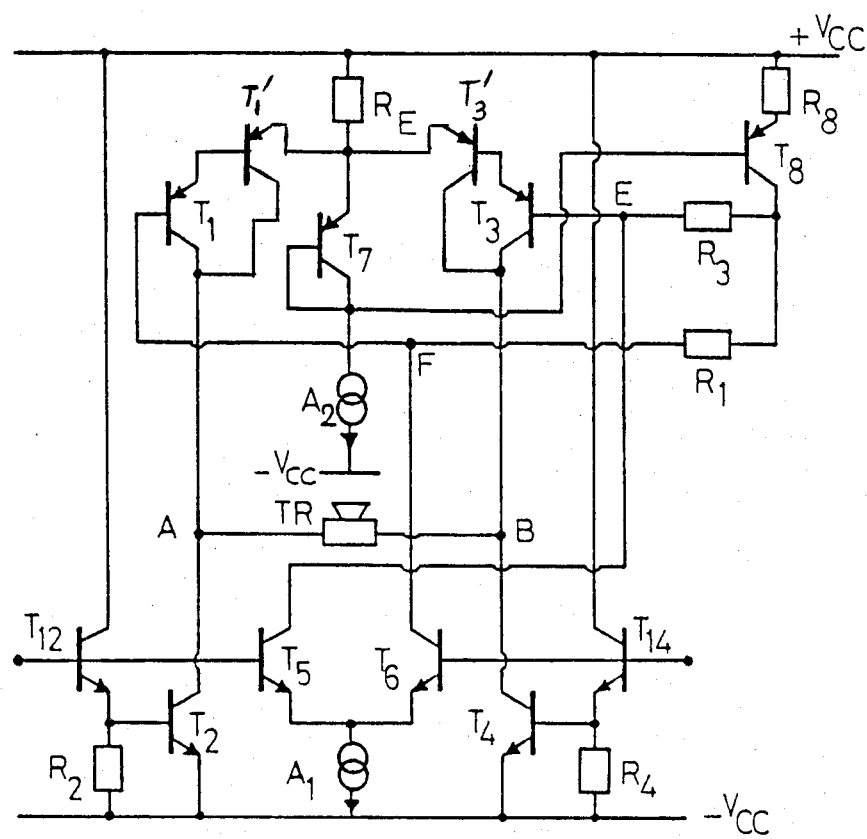

The differential amplifier structure constituted by T5 and T6 can be replaced by a more complex differential amplifier structure; and the T1 and T3 transistors can both be replaced by a Darlington type circuit as illustrated in FIG. 4, transistors $T_1'$ and $T_3'$ constituting the additional transistors forming the Darlington transistor pairs.

The bipolar transistors in the circuit can be replaced, partially or completely, with suitable circuit modifications within the capability of those skilled in the art, by field effect transistors.

We claim:

1. A final bridge stage for a receiver audio amplifier operating at a low voltage, which is monolithically integratable and useable to control an electroacoustic transducer having first and second terminals;
said stage comprising first, second, third, and fourth semiconductor circuit elements, each element having at least a first terminal, a second terminal, and a control terminal;
said first and third circuit elements having a first type of conductivity, and said second and fourth circuit elements having a second type of conductivity which is opposite to the first type of conductivity;
a first terminal of said first and third circuit elements being connected to a first pole of a supply voltage generator through a common constant current generator means;

a first terminal of said second and fourth circuit elements being connected to a second pole opposite to the first pole of said supply voltage generator;

a second terminal of said first circuit element being connected to a second terminal of said second circuit element, said connection constituting a first terminal to which said first terminal of said electroacoustic transducer is connected;

a second terminal of said third circuit element being connected to a second terminal of said fourth circuit element, said connection constituting a second terminal to which said second terminal of said electroacoustic transducer is connected;

a control terminal of said second circuit element and a control terminal of said fourth circuit element being connected to a signal source which controls such circuit elements so as to operate in phase opposition to each other;

said stage further comprises a fifth and a sixth semiconductor circuit element, each having a conductivity of the second type and each having at least a first terminal, a second terminal, and a control terminal, the first terminal of each such circuit elements being connected to the second pole of said supply voltage generator through another common constant current generator means, the control terminals of said fifth and said sixth circuit elements being connected to a signal source, which controls said fifth and said sixth circuit elements so as to operate in phase opposition to each other and in phase respectively with said second and said fourth circuit elements;

the second terminal of said fifth circuit element being connected to both the control terminal of said third circuit element and through a first resistor element to a circuit means for generating a reference voltage, the second terminal of said sixth circuit element being connected to both the control terminal of said first circuit element and through a second resistor element to said circuit means for generating a reference voltage.

2. A final stage according to claim 1, wherein the control terminal of said fifth and said sixth circuit elements are connected to the signal source through said second and said fourth circuit elements, respectively.

3. A final stage according to claim 2, wherein said second and fourth circuit elements each comprise a first and a second transistor, each having the same type of conductivity and each having a first terminal, a second terminal, and a control terminal;

the first and the second terminal of said first transistor and the control terminal of said second transistor each respectively comprising the first terminal, the second terminal and the control terminal of the circuit element itself;

the first terminal of said second transistor of the second circuit element being connected to the control terminal of said first transistor of the second circuit element, and to the control terminal of said fifth circuit element and through a resistor to said second pole of the supply voltage generator;

the first terminal of said second transistor of the fourth circuit element being connected to the control terminal of said first transistor of the fourth circuit element, to the control terminal of said sixth circuit element, and through a resistor to said second pole of the supply voltage generator, the second terminal of said second transistor of said second and fourth circuit elements being connected to said first pole of the supply voltage generator.

4. A final stage according to claims 1 or 2, wherein said first and second resistor elements are resistors.

5. A final stage according to claims 1 or 2, wherein said first and second resistor elements are diodes.

6. A final stage according to claims 1 or 2, wherein said constant current generator means comprises a third resistor element and a seventh semiconductor element having conductivity of the first type and having at least a first terminal, a second terminal and a control terminal, said second terminal of said seventh semiconductor element being connected to said second pole of said supply voltage generator through a constant current generator and its control terminal being directly connected to its second terminal;

said seventh semiconductors' first terminal also being connected to a connecting point between the first terminal of the first circuit element and the first terminal of the third circuit element and being also connected to said first pole of the supply voltage generator through said third resistor element;

and wherein said means for generating a reference voltage comprises an eighth semiconductor circuit element having conductivity of the first type and having a first terminal, a second terminal, and a control terminal; the first terminal of said eighth semiconductor being connected through a fourth resistor element to said first pole of the supply voltage generator, the control terminal being connected to the second terminal of the seventh circuit element and the second terminal being connected through the first and the second resistor elements respectively, to the second terminal of the fifth and the sixth circuit elements.

7. A final stage according to claim 6, wherein said fourth resistor element is a resistor.

8. A final stage according to claim 6, wherein at least one of said semiconductor circuit elements is a transistor, having a first terminal, a second terminal, and a control terminal, these terminals being respectively the first terminal, second terminal and the control terminal of the circuit element itself.

9. A final stage according to claim 8, wherein said transistors are bipolar transistors, the first terminal, the control terminal and the second terminal each being respectively the emitter, the base, and the collector thereof.

10. A final stage according to claims 1 or 2, wherein said first and third circuit elements each comprise a first and a second transistor, each having the same type of conductivity and each having a first terminal, a second terminal and a control terminal, the first and second terminals of the first transistor and the control terminal of the second transistor of each of the circuit elements being respectively the first terminal, the second terminal, and the control terminal of the circuit element itself;

the first and second terminals of the second transistor being connected respectively to the control terminal of the first transistor and said second pole of the supply voltage generator.

11. A final stage according to claim 1, wherein said second and fourth circuit elements each comprise a first and a second transistor, each having the same type of conductivity and each having a first terminal, a second terminal, and a control terminal;

the first and the second terminal of said first transistor and the control terminal of said second transistor each respectively comprising the first terminal, the second terminal and the control terminal of said circuit element itself;

the first terminal of said second transistor being connected to the control terminal of said first transistor, said control terminal being also connected to said second pole of the supply voltage generator through a resistor and the second terminal of said second transistor being connected to said first pole of the supply voltage generator.

12. A final stage according to claim 1, wherein at least one of said semiconductor circuit element is a transistor, having a first terminal, a second terminal, and a control terminal, these terminals being respectively the first terminal, second terminal and the control terminal of the circuit element itself.

* * * * *